United States Patent
Chen et al.

(10) Patent No.: US 10,802,935 B2
(45) Date of Patent: Oct. 13, 2020

(54) METHOD TO SUPPORT SYNCHRONOUS REPLICATION FAILOVER

(71) Applicant: EMC IP Holding Company LLC, Hopkinton, MA (US)

(72) Inventors: Xiangping Chen, Sherborn, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 177 days.

(21) Appl. No.: 16/042,363

(22) Filed: Jul. 23, 2018

(65) Prior Publication Data
US 2020/0026627 A1  Jan. 23, 2020

(51) Int. Cl.
| G06F 11/00 | (2006.01) |
| G06F 11/20 | (2006.01) |
| G06F 16/27 | (2019.01) |

(52) U.S. Cl.
CPC ...... *G06F 11/2082* (2013.01); *G06F 11/2094* (2013.01); *G06F 16/275* (2019.01); *G06F 2201/85* (2013.01)

(58) Field of Classification Search
CPC .......................... G06F 11/2082; G06F 16/275
See application file for complete search history.

(56) References Cited

U.S. PATENT DOCUMENTS

| 5,504,861 A * | 4/1996 | Crockett | G06F 11/1435 714/13 |
| 5,615,329 A * | 3/1997 | Kern | G06F 11/2064 714/6.12 |
| 7,278,049 B2 * | 10/2007 | Bartfai | G06F 11/2064 714/6.3 |
| 7,475,124 B2 * | 1/2009 | Jiang | H04L 67/1097 709/203 |
| 8,327,103 B1 | 12/2012 | Can et al. | |
| 8,332,354 B1 | 12/2012 | Chatterjee et al. | |
| 8,380,928 B1 | 2/2013 | Chen et al. | |
| 8,429,346 B1 | 4/2013 | Chen et al. | |
| 8,515,911 B1 | 8/2013 | Zhou et al. | |
| 8,539,148 B1 | 9/2013 | Chen et al. | |
| 8,566,483 B1 | 10/2013 | Chen et al. | |
| 8,583,607 B1 | 11/2013 | Chen et al. | |

(Continued)

OTHER PUBLICATIONS

U.S. Appl. No. 16/254,897, filed Jan. 23, 2019, Chen et al.

(Continued)

*Primary Examiner* — Jonathan D Gibson
(74) *Attorney, Agent, or Firm* — Daly, Crowley, Mofford & Durkee, LLP

(57) ABSTRACT

In one aspect, synchronous replication failover support is provided for a storage system that includes a source site and a target site. The failover support includes locating a recovery snap set on the source site. The source site is identified as a subject of a failover event, and the recovery snap set includes a snap set that contains a subset of data content that is also stored at the target site. The recovery snap set also has a time of creation that is equal to or greater than a timeout value for serving input/outputs (IOs) to the target site. The failover support further includes sending a difference between volumes of the source site and the recovery snap set to the target site. The difference is configured to enable in sync status between the source site and the target site.

15 Claims, 5 Drawing Sheets

(56) References Cited

U.S. PATENT DOCUMENTS

| | | |
|---|---|---|
| 8,683,153 B1 | 3/2014 | Long et al. |
| 8,712,976 B1 | 4/2014 | Chen et al. |
| 8,751,878 B1* | 6/2014 | Don .................. G06F 11/07 714/55 |
| 8,775,388 B1 | 7/2014 | Chen et al. |
| 8,782,324 B1 | 7/2014 | Chen et al. |
| 8,799,601 B1 | 8/2014 | Chen et al. |
| 8,898,507 B1 | 11/2014 | Crable et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,152,336 B1 | 10/2015 | Chen et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,606 B1 | 11/2017 | Byrne et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 2005/0021751 A1* | 1/2005 | Block .................. G06F 9/54 709/225 |
| 2005/0071708 A1* | 3/2005 | Bartfai ............... G06F 11/2064 714/6.3 |
| 2008/0232405 A1* | 9/2008 | Gallo .................. H04L 47/10 370/498 |
| 2009/0164531 A1* | 6/2009 | Tanaka ............... G06F 11/1456 |
| 2011/0321041 A1* | 12/2011 | Bhat .................. G06F 9/4856 718/1 |
| 2014/0279897 A1 | 9/2014 | Bourbonnais et al. |
| 2016/0048408 A1 | 2/2016 | Madhu et al. |
| 2016/0239396 A1* | 8/2016 | Deng .................. G06F 11/1666 |
| 2017/0149870 A1 | 5/2017 | Arnold et al. |
| 2017/0185323 A1* | 6/2017 | Kaushik ............... G06F 11/1471 |
| 2017/0192857 A1 | 7/2017 | Meiri et al. |
| 2017/0262520 A1 | 9/2017 | Mitkar et al. |
| 2019/0163370 A1 | 5/2019 | Sure et al. |
| 2019/0278663 A1 | 9/2019 | Mehta et al. |
| 2019/0356609 A1* | 11/2019 | Grunwald ........... G06F 11/2082 |

OTHER PUBLICATIONS

U.S. Appl. No. 16/038,543, filed Jul. 18, 2018, Chen et el.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/038,543, filed Jul. 18, 2018, Chen et al.
Non-Final Office Action dated Mar. 31, 2020. U.S. Appl. No. 16/038,543, 40 pages.
Response to Non-Final Office Action filed Apr. 10, 2020, U.S. Appl. No. 16/038,543, 14 pages.

* cited by examiner

METHOD TO SUPPORT SYNCHRONOUS REPLICATION FAILOVER

BACKGROUND

Synchronous (sync) replication is a business continuity process that mirrors data updates between two systems to prevent data loss and downtime. When sync replication is turned on for a production storage object, the system mirrors the data to a target system as part of handling write requests from an initiator, and only responds to the initiator after the writes have been persisted on both the source and target systems.

In the event of a source site disaster or data loss, a replication failover process may be implemented. During replication failover, the source and target sites are out of sync, as the source site may possess some data that hasn't yet been written to the target site, and the new the target site may possess some data that are written after the application starts to write. This out-of-sync situation presents a challenge to resume and recover sync replication after the original source system is recovered. Unlike asynchronous (async) replication, sync replication does not maintain a list of synchronized snap sets to perform incremental recovery and re-sync after failover. Without a good solution, a user may need to perform a full re-sync, which is time consuming as well as bandwidth consuming.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to support synchronous replication failover for a storage system including a source site and a target site. The method includes locating a recovery snap set on the source site. The source site is identified as a subject of a failover event, and the recovery snap set includes a snap set that contains a subset of data content that is also stored at the target site and has a time of creation that is equal to or greater than a timeout value for serving input/outputs (IOs) to the target site. The method further includes sending a difference between volumes of the source site and the recovery snap set to the target site, the difference configured to enable in sync status between the source site and the target site.

Another aspect may provide a system to support synchronous replication failover for a storage system including a source site and a target site. The system includes a memory having computer-executable instructions. The system also includes a processor operated by a storage system. The processor executes the computer-executable instructions. When executed by the processor, the computer-executable instructions cause the processor to perform operations. The operations include locating a recovery snap set on the source site. The source site is identified as a subject of a failover event, and the recovery snap set includes a snap set that contains a subset of data content that is also stored at the target site and has a time of creation that is equal to or greater than a timeout value for serving input/outputs (IOs) to the target site. The operations further include sending a difference between volumes of the source site and the recovery snap set to the target site, the difference configured to enable in sync status between the source site and the target site.

Another aspect may provide a computer program product embodied on a non-transitory computer readable medium. The computer program product includes instructions that, when executed by a computer at a storage system, causes the computer to perform operations. The operations include locating a recovery snap set on the source site. The source site is identified as a subject of a failover event, and the recovery snap set includes a snap set that contains a subset of data content that is also stored at the target site and has a time of creation that is equal to or greater than a timeout value for serving input/outputs (IOs) to the target site. The operations further include sending a difference between volumes of the source site and the recovery snap set to the target site, the difference configured to enable in sync status between the source site and the target site.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Embodiments described herein provide synchronous replication failover processes in a storage system. The synchronous replication failover processes perform incremental recovery for sync replication even without a synchronized snap set. By performing incremental re-sync, the time and bandwidth consumption used to resume sync replication after failover is minimized.

In async replication, data to be replicated are from read-only snapshots. All data content from the source snapshot are copied to a target snapshot, and the two snapshots contain the same data at the end of each successful replication cycle. A pair of snap sets with the same content is referred as synchronized (between a source and target system) snapshot sets. In sync replication, however, data to be replicated are from production data volumes that change constantly; thus, it becomes challenging to create synchronized snapshot sets without pausing and draining IO for production volumes. In this scenario, the pausing/draining IOs and creating snap sets may cause major IO latency hiccups for applications.

In lieu of synchronized snap sets between source and target systems, the synchronous replication failover processes provide a new concept referred to herein as a "recovery snap set" Recovery snap sets are created in pairs on source and target systems. For each pair, the source side snap set is a subset of the target side snap set. If it is known that the recovery snap set contains less than or an equal amount of data than what is on the target, it could be used as a base to send a delta between the source storage volumes and the recovery snap set to the target to achieve in sync status between the source and target. Compared to performing a full sync, this delta transfer provides time savings and bandwidth consumption savings.

In some types of storage systems, such as XtremIO, it is known that a snap set may be used in a sync replication if it is created earlier than a maximum defined I/O timeout value, e.g., 30 seconds. In applying this I/O time value of 30 seconds, by way of illustration, and given a system designed to guarantee that all I/Os are served within the maximum timeout value, if a snap set is created on the source system 30 seconds ago, then all data that are saved in this snap set must also be completed on the target system. Similarly, if a snap set is created on the target system 30 seconds ago, it is determined that data save in the snap set are also saved on the source. If snap sets are periodically created during sync replication, at the time of failover, the process finds a snap set that is created 30 second prior to the time of failover. That snap set can then be used for incremental recovery after failover. This holds true regardless of whether the replication writes complete on the source first or on the target first.

Figure 1:
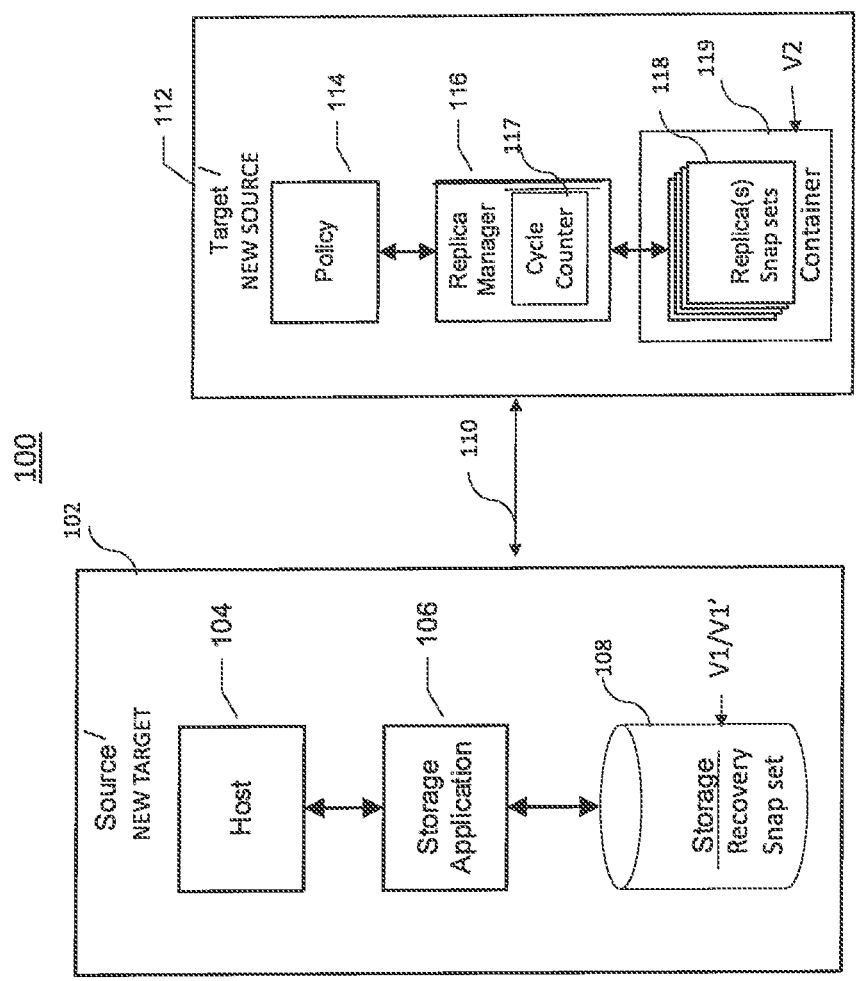
FIG. 1 is a block diagram of a storage system to perform synchronous replication failover processes in accordance with an illustrative embodiment.

Turning now to FIG. 1, an example storage system 100 for implementing synchronous replication failover processes will now be described. Storage system 100 may include at least one source site 102 and at least one target site 112. In an embodiment, target site 112 is either co-located with source site 102 or is in close geographic proximity (e.g., within the same building or building complex) with the source site 102. In other embodiments, target site 112 is remotely located from the source site 102. For example, target site 112 may be geographically dispersed across cities, states, or even countries with respect to source site 102.

Source site 102 may include a host 104, storage application 106, and data storage 108. In some embodiments, storage 108 may include one or more storage volumes (e.g., V1), that operate as active or production volumes.

Host 104 may perform I/O operations on storage 108 (e.g., read data from and write data to storage 108). In some embodiments, the I/O operations may be intercepted by and controlled by the storage application 106. As changes are made to data stored on storage 108 via the I/O operations from host 104, or over time as storage system 100 operates, storage application 106 may perform data replication from the source site 102 to the target site 112 over a communication network 110. In some embodiments, the communication network 110 may include internal (e.g., short distance) communication links (not shown) to transfer data between storage volumes for storing replicas 118 (also referred to herein as snap sets), such as an InfiniBand (IB) link or Fibre Channel (FC) link. In other embodiments, the communication link 110 may be a long-distance communication network of a storage area network (SAN), e.g., over an Ethernet or Internet (e.g., TCP/IP) link that may employ, for example, the iSCSI protocol.

In illustrative embodiments, storage system 100 may employ a snap set (or replication) mechanism to replicate data between source site 102 and target site 112. A snap set (or replica) may be created from data within storage 108 and transferred to the target site 112 during a data replication cycle by data replication.

Data replication may be performed based on data replication policies that may define various settings for data recovery operations, shown as policy 114 in target site 112. For example, policy 114 may define a plurality of attributes, such as a frequency with which replicas are generated and how long each replica 118 is kept at target site 112. In some embodiments, policy 114 defines metrics for use in snap set creation and replication process determinations.

As described herein, in example embodiments, data replication may be synchronous data replication with snap sets created in dynamic intervals during operation of storage system 100. The timing of synchronous replication cycles and the retention of the replicas 118 may be managed by replica manager 116 of target site 112.

In addition to managing replicas 118 according to a policy 114 (e.g., a replication and/or retention policy), the replica manager 116 may also include a cycle counter 117 to track generations of snap sets over time.

It will be understood that the roles of the source site 102 and the target site 112 may be reversed in instances, e.g., in which an event occurring on the source site 102 causes the target site 112 to intercept I/Os and take on the role of snap set creation and replication to the source site. This role reversal is referred to as a failover event. In this manner, the processes described herein apply equally to the target site.

Figure 2:
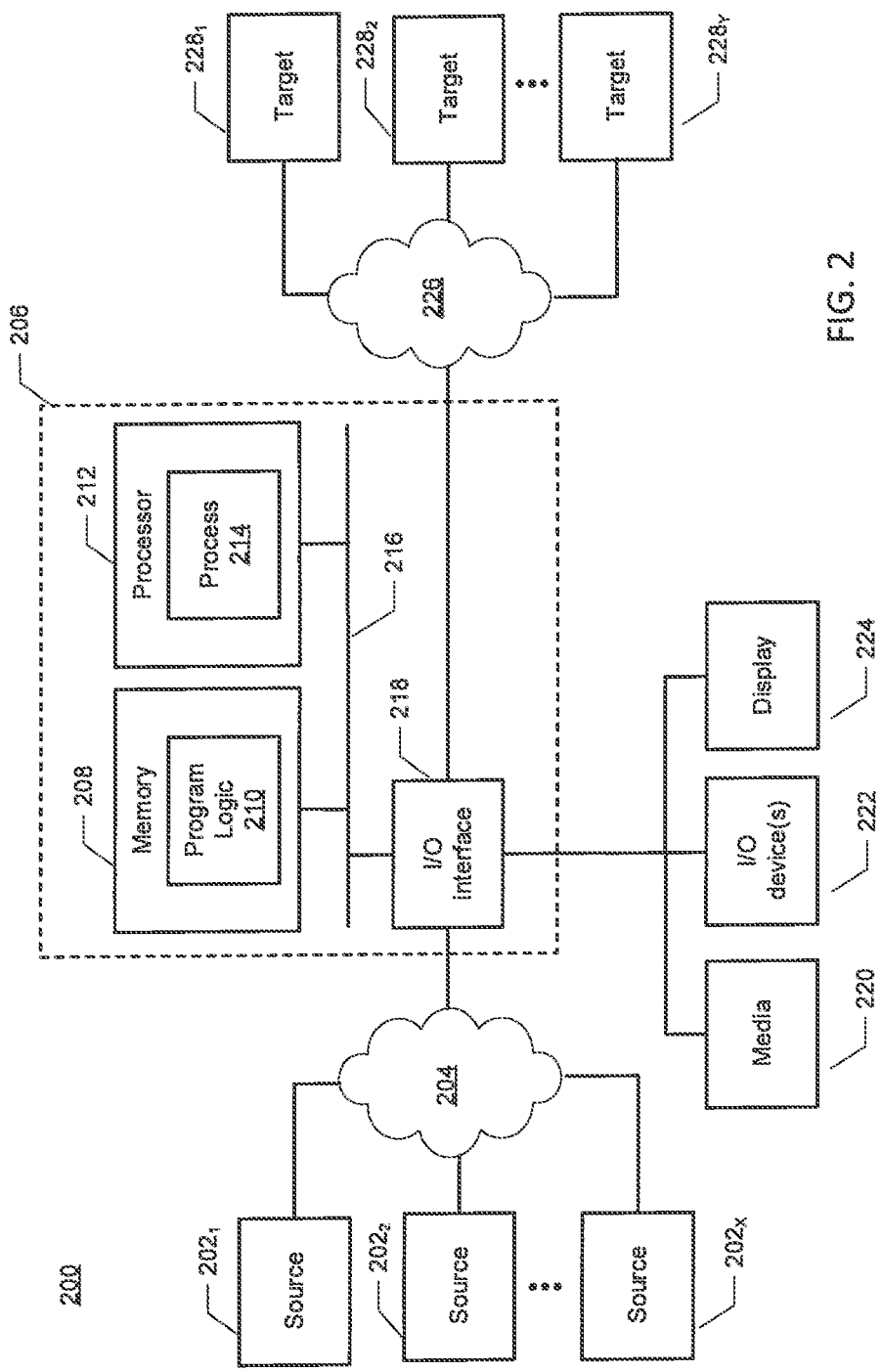
FIG. 2 is a block diagram of another storage system to perform synchronous replication failover processes in accordance with an illustrative embodiment.

Referring to FIG. 2, in an illustrative embodiment, an apparatus 206 may form part of system 200 and include a memory 208 storing program logic 210, a processor 212 for executing a process 214, and a communications I/O interface 218, connected via a bus 216 to allow communication between memory 208, processor 212 and devices external to apparatus 206. Apparatus 206 may correspond to elements of the source site 102 of FIG. 1. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via a network 204. Source devices $202_1$-$202_X$ may correspond to elements of the source site 102 in FIG. 1. In some embodiments, communications I/O interface 218 may couple apparatus 206 to one or more target devices $228_1$-$228_Y$ via networks 226. Target devices $228_1$-$228_Y$ may correspond to elements of the target site 112 in FIG. 1. In some embodiments, networks 226 of FIG. 2 may include a communication fabric between volumes of targets 228. For example, in some embodiments, networks 226 may include an InfiniBand (IB) network or a Fibre Channel (FC) network. Networks 226 may also include a long-distance communication network of a storage area network (SAN), e.g., over an Ethernet or Internet (e.g., TCP/IP) link that may employ, for example, the iSCSI protocol.

Figure 3:
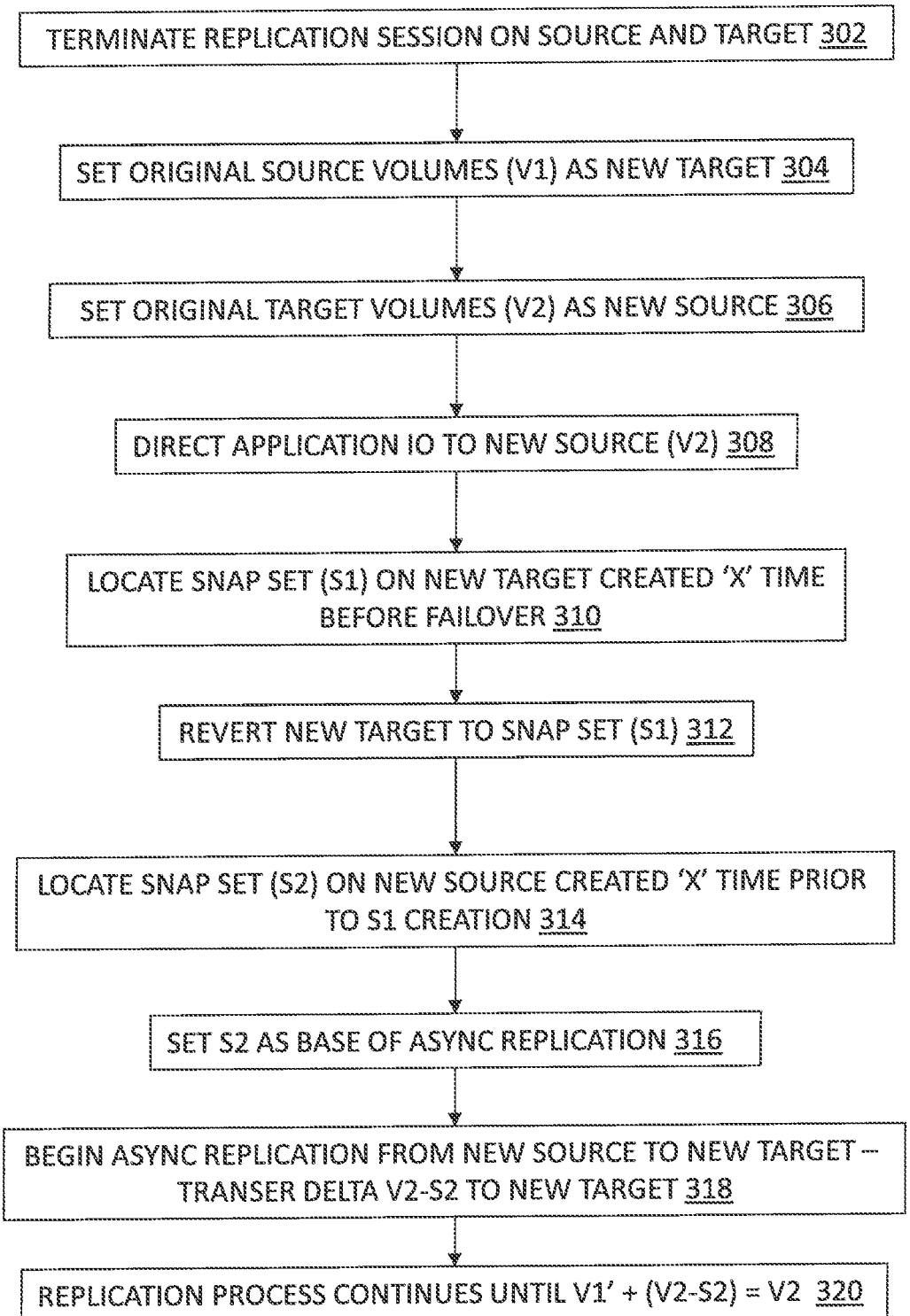
FIG. 3 is a flow diagram of a process to perform synchronous replication failover processes in accordance with an illustrative embodiment.

Turning now to FIG. 3, a process 300 for implementing the synchronous replication failover processes will now be described in accordance with illustrative embodiments. The process 300 may be implemented, e.g., by the storage application 106 of FIG. 1. The process 300 assumes that at least a first snap set has been created at the source system, which provides a point of reference in measuring elapsed time between snap set creation, as will be described further in FIG. 3. In the process of FIG. 3, a source system refers to a source site (e.g., site 102 of FIG. 1) or a source device 202 of FIG. 2. A target system refers to a target site 112 of FIG. 1 or one of target devices 228 of FIG. 2.

In block 302, the replication session on the source system and the target system are terminated. In block 304, the process 300 sets the original source production volumes (V1) as the new target. In block 306, the process 300 sets the original target volumes (V2) as the new source. The process 300 directs the application IOs to the new source (V2) at block 308.

In block 310, the process 300 locates a snap set (S1) on the new target that was created at a specified period of time prior to the failover event. The specified time period refers to the maximum defined IO timeout value, which can be a storage system default value or a user-configurable value.

In block 312, the process 300 reverts the new target to the snap set S1. This to eliminate all possible inflight IO data that are saved at the original source (new target) but may not be fully synced. Now the new target production becomes V1', with S1=V1'<=V2.

In block 314, the process 300 locates a second snap set (S2) on the new source that was created a specified period of time (e.g., an amount of time equivalent to maximum defined IO timeout value) prior to the creation of S1. In block 316, the process 300 sets S2 as abase of async replication. In block 318, asynchronous replication is initiated from the new source to the new target. This includes transferring the delta, or difference, between V2 and S2 (V2−S2) to the new target until the source and target are in sync (V1'+(V2−S2)=V2) at block 320.

Figure 4:
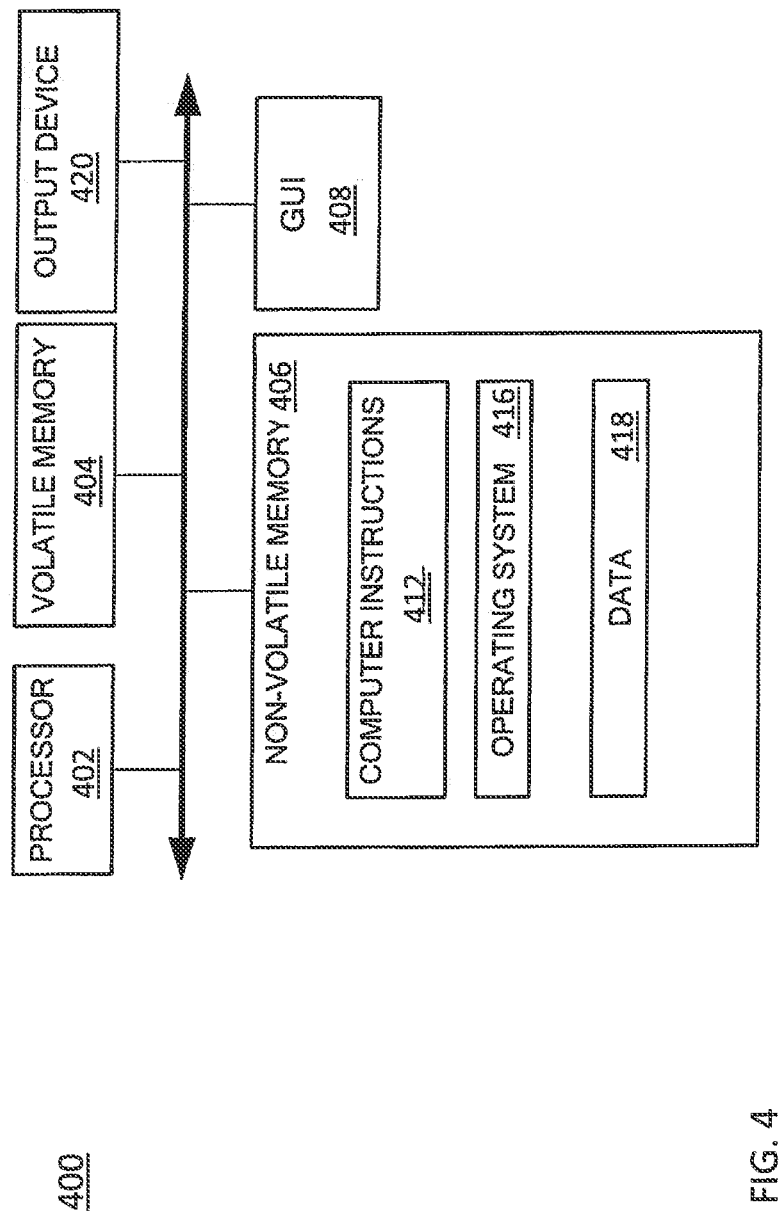
FIG. 4 is a block diagram of a hardware device that may perform at least a portion of the process shown in FIG. 3.

Referring to FIG. 4, in some embodiments, the source site 102 and/or target site 112 may be implemented as one or more computers. Computer 400 may include processor 402, volatile memory 404 (e.g., RAM), non-volatile memory 406 (e.g., a hard disk drive, solid state drive such as a flash drive, a hybrid magnetic and solid state drive, etc.), graphical user interface (GUI) 408 (e.g., a mouse, a keyboard, a display, and so forth) and input/output (I/O) device 420. Non-volatile memory 406 stores computer instructions 412, an operating system 416 and data 418 such that, for example, the computer instructions 412 are executed by the processor 402 out of volatile memory 404 to perform at least a portion of the process 300 shown in FIG. 3. Program code may be applied to data entered using an input device of GUI 408 or received from I/O device 420.

Process 300 shown in FIG. 3 is not limited to use with the hardware and software of FIG. 4 and may find applicability in any computing or processing environment and with any type of machine or set of machines that is capable of running a computer program. Process 300 shown in FIG. 3 may be implemented in hardware, software, or a combination of the two.

The processes described herein are not limited to the specific embodiments described. For example, process 300 is not limited to the specific processing order shown in FIG. 3. Rather, one or more blocks of process 300 may be re-ordered, combined or removed, performed in parallel or in serial, as necessary, to achieve the results set forth herein.

Processor 402 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow chart of FIG. 3, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 5:
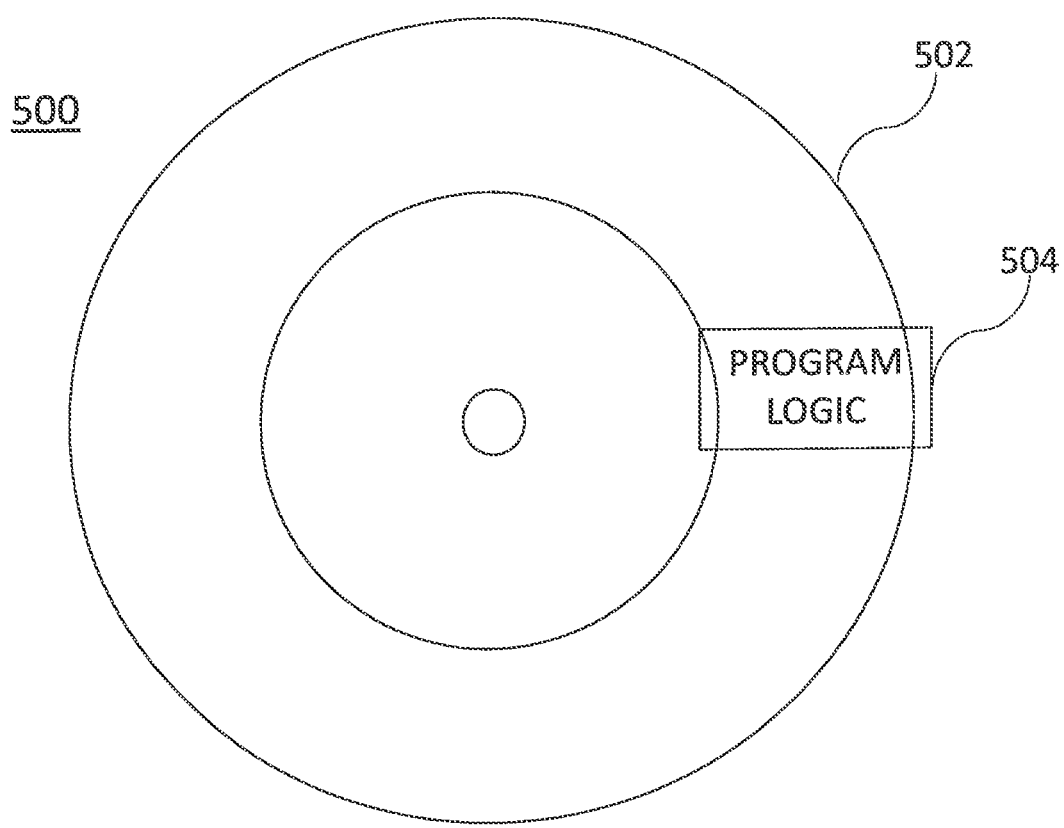
FIG. 5 a simplified block diagram of an apparatus that may be used to implement at least a portion of the systems of FIGS. 1-2 and 4 and at least a portion of the process of FIG. 3.

For example, when the program code is loaded into and executed by a machine, such as the computer of FIG. 4, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 5 shows Program Logic 504 embodied on a computer-readable medium 502 as shown, and wherein the Logic is encoded in computer-executable code configured for carrying out the reservation service process of this invention and thereby forming a Computer Program Product 500. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method to support synchronous replication failover for a storage system including a source site and a target site, comprising:

locating a recovery snap set (S1) on the source site, the source site identified as a subject of a failover event during a synchronous replication session, the recovery snap set (S1) containing a subset of data content that is less than or equal to data stored in a snap set at the target site, and has a time of creation that precedes the failover event by a specified amount of time, the specified amount of time defined by a timeout value designated for serving input/outputs (IOs) to the target site;

setting a source volume (V1) of the source site as a new target volume (V1') and designating the source site as a new target site;

setting a target volume (V2) of the target site as a new source volume (V2') and designating the target site as a new source site;

directing the IOs to the new source site;

reverting the new target volume (V1') to the recovery snap set (S1), wherein the recovery snap set (S1) is equal to the new target volume (V1'), and the new target volume (V1') is less than or equal to the target volume (V2);

locating another snap set (S2) on the new source volume (V2') that has been created before creation of the recovery snap set (S1) on the new target site; and setting the other snap set (S2) as a base of asynchronous replication with respect to the recovery snap set (S1).

2. The method of claim 1, further comprising:

terminating the synchronous replication session on the source site and the target site prior to locating the recovery snap set (S1).

3. The method of claim 1, further comprising initiating the asynchronous replication from the new source site to the new target site, the asynchronous replication including transferring a difference between the target volume (V2) on the target site and the other snap set (S2) located on the new source site to the new target site.

4. The method of claim 3, wherein the transferring is performed until the target volume (V2) is equal to a difference between the target volume (V2) and the other snap set (S2) plus the new target volume (V1').

5. The method of claim 1, wherein the timeout value is 30 seconds.

6. A system to support synchronous replication failover for a storage system including a source site and a target site, the system comprising:

a memory comprising computer-executable instructions; and a processor operable by a storage system, the processor executing the computer-executable instructions, the computer-executable instructions when executed by the processor cause the processor to perform operations comprising:

locating a recovery snap set (S1) on the source site, the source site identified as a subject of a failover event during a synchronous replication session, the recovery snap set (S1) containing a subset of data content that is less than or equal to data stored in a snap set at the target site, and has a time of creation that precedes the failover event by a specified amount of time, the specified amount of time defined by a timeout value designated for serving input/outputs (IOs) to the target site;

setting a source volume (V1) of the source site as a new target volume (V1') and designating the source site as a new target site;

setting a target volume (V2) of the target site as a new source volume (V2') and designating the target site as a new source site;

directing the IOs to the new source site;

reverting the new target volume (V1') to the recovery snap set (S1), wherein the recovery snap set (S1) is equal to the new target volume (V1'), and the new target volume (V1') is less than or equal to the target volume (V2);

locating another snap set (S2) on the new source volume (V2') that has been created before creation of the recovery snap set (S1) on the new target site; and setting the other snap set (S2) as a base of asynchronous replication with respect to the recovery snap set (S1).

7. The system of claim 6, wherein the operations further include:

terminating the synchronous replication session on the source site and the target site prior to locating the recovery snap set (S1).

8. The system of claim 6, wherein the operations further comprise initiating the asynchronous replication from the new source site to the new target site, the asynchronous replication including transferring a difference between the target volume (V2) on the target site and the other snap set (S2) located on the new source site to the new target site.

9. The system of claim 8, wherein the transferring is performed until the target volume (V2) is equal to a difference between the target volume (V2) and the other snap set (S2) plus the new target volume (V1').

10. The system of claim 6, wherein the timeout value is 30 seconds.

11. A computer program product embodied on a non-transitory computer readable medium, the computer program product including instructions that, when executed by a computer, causes the computer to perform operations comprising:

locating a recovery snap set (S1) on the source site, the source site identified as a subject of a failover event during a synchronous replication session, the recovery snap set (S1) containing a subset of data content that is less than or equal to data stored in a snap set at the target site, and has a time of creation that precedes the failover event by a specified amount of time, the specified amount of time defined by a timeout value designated for serving input/outputs (IOs) to the target site;

setting a source volume (V1) of the source site as a new target volume (V1') and designating the source site as a new target site;

setting a target volume (V2) of the target site as a new source volume (V2') and designating the target site as a new source site;

directing the IOs to the new source site;

reverting the new target volume (V1') to the recovery snap set (S1), wherein the recovery snap set (S1) is equal to the new target volume (V1'), and the new target volume (V1') is less than or equal to the target volume (V2);

locating another snap set (S2) on the new source volume (V2') that has been created before creation of the recovery snap set (S1) on the new target site; and setting the other snap set (S2) as a base of asynchronous replication with respect to the recovery snap set (S1).

12. The computer program product of claim 11, wherein the operations further comprise:

terminating the synchronous replication session on the source site and the target site prior to locating the recovery snap set (S1).

13. The computer program product of claim 11, wherein the operations further comprise initiating the asynchronous replication from the new source site to the new target site, the asynchronous replication including transferring a difference between the target volume (V2) on the target site and the other snap set (S2) located on the new source site to the new target site.

14. The computer program product of claim 13, wherein the transferring is performed until the target volume (V2) is equal to a difference between the target volume (V2) and the other snap set (S2) plus the new target volume (V1').

15. The computer program product of claim 11, wherein the timeout value is 30 seconds.

* * * * *